Feb. 12, 1935.   A. M. KAHN ET AL   1,991,098
SIMPLEX SYNCHRONOUS MOTOR CONTROL SYSTEM
Filed June 13, 1931
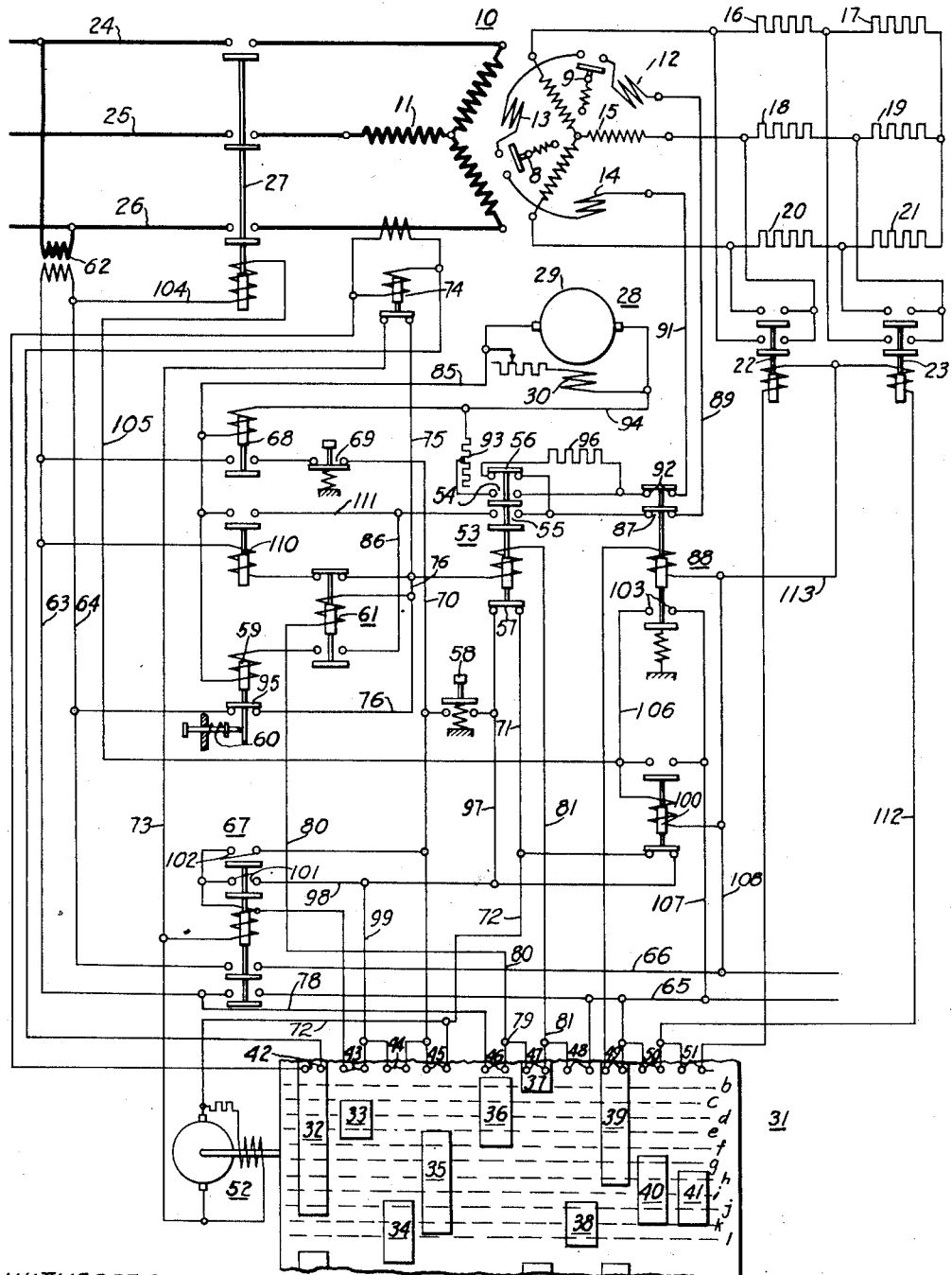
WITNESSES:
E. A. M'Closkey
N. S. Chilcott
INVENTORS.
Armard M. Kahn
and Merritt A. Hyde.
BY W. R. Coley
ATTORNEY Patented Feb. 12, 1935

1,991,098

UNITED STATES PATENT OFFICE 1,991,098

SIMPLEX SYNCHRONOUS MOTOR CONTROL SYSTEM

Armand M. Kahn and Merritt A. Hyde, Wilkinsburg, Pa., assignors to Westinghouse Electric & Manufacturing Company, a corporation of Pennsylvania Application June 13, 1931, Serial No. 544,052

15 Claims. (Cl. 171—118)

Our invention relates, generally, to motor control systems, and, more particularly, to systems for controlling the starting of synchronous motors.

The object of our invention, generally stated, is to provide a control system for synchronous motors which shall be simple and efficient in operation and which may be economically manufactured and installed.

A more specific object of our invention is to provide for automatically testing the condition of the internal field circuit of a synchronous motor to determine if it is open circuited before the starting voltage is applied to the motor.

The object of our invention, stated differently, is to provide for starting a synchronous motor with its field winding open circuited and automatically testing the condition of the field circuit before voltage is applied to the motor through the functioning of means disposed to respond to current flowing in the field circuit to render the voltage applying means ineffective.

A further object of our invention is to provide a starting system for a synchronous motor, having a centrifugally-operating field sectionalizing switch, which functions to prevent the application of voltage to the stator windings in the event that the field sectionalizing switch has not functioned to automatically open the internal field circuit of the motor when the motor speed is reduced below a predetermined value or the motor is stopped.

A further object of our invention is to provide a starting system for a synchronous motor which shall function to automatically disconnect the field winding from its excitation source and connect it across a discharge resistor in the event of a failure of the power source supplying the motor and to maintain such connection regardless of whether or not the power source is restored to a normal energized condition.

For a more complete understanding of the nature and objects of our invention, reference may now be had to the following detailed description, taken in conjunction with the drawing in which the single figure is a diagrammatic view of a motor control system embodying the principal features of our invention.

Referring now to the drawing, the reference character 10 designates generally a synchronous motor of the type fully disclosed and described in application for Letters Patent, Serial No. 385,902, filed by Henry V. Putman August 14, 1929, having a stator or armature winding 11, a field winding divided into a plurality of sections 12, 13 and 14, and a polyphase damper winding 15. The terminals of the damper winding and the field winding are brought out to slip rings (not shown) on the motor shaft in a well known manner.

A plurality of starting resistors 16 to 21, inclusive, are provided for controlling the resistance of the damper winding during the starting period. These resistors may be controlled in a well known manner by means of shunting switches 22 and 23, which are controlled in a manner to be described hereinafter.

The motor 10 may be operated from any suitable source of alternating-current power, which may be represented in this instance by conductors 24, 25 and 26.

A line switch 27 is provided for connecting the stator winding of the motor to the power source, and is controlled in a manner to be more fully described hereinafter.

The motor may be supplied with excitation current from any suitable direct-current source, illustrated in this instance by an exciter 28, having an armature 29 and field winding 30, which may be driven in any suitable manner independently of the motor 10.

In order to provide for controlling the energization of the operating circuits for the shunting switches 22 and 23, the line switch 27 and various other control relays and switches that will be described hereinafter, a motor-operating switch is utilized. The particular switch illustrated comprises a plurality of movable contact segments 32 to 41, inclusive, which are disposed to be actuated into engagement with stationary contact fingers 42 to 51, inclusive, by means of a suitable pilot motor 52 in a predetermined sequence. It will be readily understood, however, that any other suitable sequence switch, having the same general operating characteristics may be used instead of the one illustrated.

It is well understood that there are several important advantages to be gained, when starting a synchronous motor of large capacity on full voltage, by maintaining the field winding in an open-circuited condition during the initial stages of the starting period.

In some cases, the field winding of the motor is merely shunted by a resistor, but this has the disadvantage that a large low-power factor current flows in the closed circuit until the motor reaches synchronous speed. This may be eliminated by leaving the field circuit open, but if such procedure is followed in the case of machines having a relatively large number of turns in the field winding without providing for sectionalizing the field winding, a very high voltage will be induced therein, which may cause serious damage to the field windings and the whole field structure.

In order to overcome such difficulty and still have open field starting, the motor may be provided with a centrifugally-operated field sectionalizing switch, as described in the application for Letters Patent of Henry V. Putman as referred to hereinbefore.

However, when such an arrangement is resorted to, provision must then be made to check the condition of the field winding before voltage is applied to the stator winding, and further, to prevent the application of starting voltage to the motor unless the field sectionalizing switch has opened the internal field winding circuit of the motor at the desired number of points.

In order to provide for checking the condition of the field winding before applying the starting voltage, we have provided a field switch 53, having normally opened contact members 54 and 55 and normally-closed contact members 56 and 57, which functions to connect the field winding to a source of power to establish a test circuit before the starting voltage is applied to the motor.

As will be described hereinafter, the field switch 53 is closed in response to the operation of the motor-operated switch 31, which is set into operation by means of a "start" switch 58, of any suitable construction.

In order, however, to prevent the closure of the line switch 27 in response to further operation of the motor-operated switch 31, a current-responsive relay 59, provided with a latching device 60, is utilized. The operating winding of this relay is disposed to be connected in the field circuit in response to the closure of the field switch 53 and a switch 61, both of which are closed by the motor-operated switch 31, before it closes the operating circuit for the line switch 27.

The current relay 59 is so designed and adjusted that it will operate to open and latch its contact members to stop and prevent further operation of the motor-operated switch 31 if there is a flow of current in the field circuit, or in other words, if the field sectionalizing switch has failed to open when the motor was last stopped or slowed down to a speed below which the sectionalizing switch is set to operate.

In this instance, current for operating the various switches and relays is obtained from the alternating-current source by means of a suitable voltage transformer 62, which energizes control conductors 63 and 64, as shown.

Certain of the control switches and relays are energized from conductors 63 and 64 and others from conductors 65 and 66, which are only energized when the low-voltage switch 67 is closed. This switch is open during the initial stages of the starting operation and is closed in its proper sequence by the motor-operated switch 31 as will be described hereinafter.

In order that a more comprehensive understanding of the invention may be obtained, the operation of the starting system will now be described.

Assuming that the exciter 28 is developing voltage, switch 68, having its coil connected directly across the exciter, is closed and the starting operation may be initiated by closing the "start" switch 58. This closes an energizing circuit, for the motor-operated switch 31, which extends from control conductor 63, through the closed contact members of switch 68, "stop" switch 69, conductor 70, "start" switch 58, contact members 57 of the field switch 53, conductors 71 and 72, pilot motor 52, conductor 73, contact members of an overload relay 74, conductors 75 and 76, contact members 95 of current relay 59, to control conductor 64.

Accordingly, the motor-operated switch 31 starts to operate, and at position "b", contact fingers 46 are bridged by segment 36, which establishes an energizing circuit for closing the field switch 53 and switch 61 to set up the test circuit for the field winding.

The energizing circuit thus established extends from control conductor 63, through conductor 78, contact fingers 46, bridged by segment 36 to junction point 79 where it divides, one branch extending through conductor 80 and coil of switch 61 to conductor 76, and the other branch extending through contact fingers 47 bridged by segment 37, conductor 81 and coil of field switch 53 to conductor 76 where branch circuits again unite, and through conductor 76 and contact members 95 of the current relay 59 to control conductor 64.

Upon the closure of the field switch 53, a test circuit is established for the motor field winding comprising sections 12, 13 and 14, which extends from one terminal of the exciter 28, through conductor 85, coil of the current relay 59, contact members of relay 61, conductor 86, contact members 55 of the field switch 53, contact members 87 of an auxiliary field switch 88, and conductor 89 to the first section 12 of the motor field winding. If the centrifugally-operated field sectionalizing switch has functioned properly, when the motor was last stopped, its contact members 8 and 9 are in the open position, as shown, and consequently a complete field energizing circuit cannot be established. However, in the event that contact members 8 and 9 are in their closed position, which would be the case if the sectionalizing switch had failed to function properly, the field circuit is completed from section 12 of the field winding through switch 9, section 13, switch 8, section 14, conductor 91, contact members 92 of the auxiliary field switch 88, contact members 54 of the field switch 53, field rheostat 93 and conductor 94 to the opposite terminal of the exciter.

As will be readily understood, if the test circuit is fully completed, current will flow from the exciter to effect the operation of the current relay 59. This relay as described hereinbefore, has its normally-closed contact members 95 connected in the energizing circuit for the pilot motor 52 of the sequence switch 31, and consequently, if the internal field circuit of the motor has not been opened by the sectionalizing switch, the starting sequence is stopped by rendering the motor-operated switch 31 ineffective to further initiate control operations. In such case, the starting system is rendered inoperative and the motor cannot be started until the centrifugally-operated sectionalizing switch has been opened and the latch 60 released to permit the current relay 59 to close.

It is apparent that the functioning of the current relay 59 to arrest the operation of the motor-operated switch 31 prevents the operation of the line switch 27, and thereby insures that the starting voltage cannot be applied to the stator windings unless the internal field circuit of the motor is in the proper condition.

In this instance the voltage for testing the field winding has been obtained from the exciter 28, however, any other voltage source may be utilized, such (for example, as a battery or an alternating current source.

In the event that the sectionalizing switch has been in the open circuited condition, the motor-operated switch 31 continues to operate at a definite speed, as determined by the speed of the motor 52.

As will be observed, as the sequence drum passes position "b", contact segment 37 disengages from contact fingers 47, thereby deenergizing the field switch 53. The switch 53 opens its contact members 54 and 55 to disconnect the field winding from the exciter and closes its contact members 56 to connect a resistor 96 in shunt relation to the field winding in order to provide a field discharge circuit for the motor.

Shortly after the field switch 53 is deenergized and at position "c" of the sequence drum, contact segment 33 engages contact fingers 43 to establish an operating circuit for the low-voltage relay 67. This circuit extends from conductor 63, through contact members of relay 68, "stop" switch 69, conductor 70 and "start" switch 58 which is still held in the closed position by the operator, conductors 97, 98 and 99, contact fingers 43 bridged by segment 33, coil of low-voltage relay 67, conductor 73, contact members of overload relay 74, conductors 75 and 76, and contact members 95 of current relay 59, to conductor 64.

As explained hereinbefore, the closure of low-voltage relay 67 energizes conductors 65 and 66, thereby rendering the motor-operated switch 31, further effective to cause the operation of other relays to complete the starting operation. As will be observed, contact members 101 of the low-voltage relay 67 bridge contact fingers 43 to provide a holding circuit for the relay, while contact members 101 and 102 establish a bridging circuit around the start switch 58 which may now be released by the operator.

As will be observed, the coil of the auxiliary field switch 88 is connected directly across conductors 65 and 66, through contact fingers 49, which are now bridged by segment 39, and consequently, when conductors 65 and 66 are energized, the auxiliary field switch 88 is operated and opens contact members 87 and 92 and closes contact members 103. The opening of contact members 87 and 92 completely isolates the field winding of the motor from the other control circuits, while the closure of contact members 103 establishes operating circuits for the line switch 27 and the control relay 100.

The operating circuit thus established for the line switch 27 may be traced from conductor 64, conductor 104, coil of switch 27, conductors 105 and 106, contact members 103 of the auxiliary field switch 88 and conductor 107 to the energized conductor 65.

As shown, the operating coil of relay 100 is connected directly across conductors 65 and 66, through conductor 107, contact members 103 of the auxiliary field relay, conductor 106, coil of relay 100 and conductor 108 to conductor 66. The closure of relay 100 bridges the contact members 103 of the auxiliary field switch, thereby establishing its own holding circuit and also a holding circuit for the line switch 27, which permits the deenergization of the auxiliary field switch without disconnecting the motor from the power source.

In the event that the operator wishes to inch the motor, this control function may be accomplished by merely actuating the "stop" switch 69, which effects the opening of low-voltage relay 67 and deenergizes the pilot motor 52 of the motor-operated switch 51, and also deenergizes conductors 65 and 66 to effect the opening of the auxiliary field switch 88 and relay 100, which, in turn, effect the opening of the line switch 27. By releasing the "stop" switch 69, and pressing the "start" switch 58, the low-voltage relay is again closed to effect the closure of auxiliary field switch 88, relay 100 and the line switch 27 to again energize the motor 10 and the motor-operated switch 31.

The inching operation may be continued until the sequence drum of switch 31 is moved to position "e" where contact fingers 45 are bridged by segment 35, thereby establishing an energizing circuit for the pilot motor 52, which is unaffected by the opening of the low-voltage relay. The circuit thus established may be traced from conductor 63 through contact members of relay 68, "stop" switch 69, conductor 70, contact members 45, bridged by segment 35, conductor 72, pilot motor 52, conductor 73, contact members of overload relay 74, conductors 75 and 76, contact members 95 of current relay 59, to conductor 64.

The motor-operated switch 31 continues to operate, and at position "f", contact fingers 46 are disengaged by their segment 36, thereby interrupting the circuit previously traced for relay 61, which has its lower contact members connected in the field test circuit. Its upper contact members, however, are disposed, when the relay is deenergized, to connect the operating coil of relay 110 across the control source comprising conductors 63 and 64, through contact members 95 of the current relay 59 and conductor 76.

The closure of relay 110 establishes a shunt circuit around the operating coil of current relay 59 and the lower contact members of relay 61, through conductor 111, as shown, which renders the current relay inoperative and connects contact members 55 of the field switch 53 directly to the exciter terminal through conductors 111, contact members of relay 110 and conductor 85.

At this point in the starting sequence, the motor speed has increased to a value such that it is now desirable to reduce the resistance of the damper winding 15 by shunting the starting resistors 16 to 21, inclusive.

It will be observed that shortly after the sequence drum passes position "f", contact fingers 50 are bridged by segment 40 to establish an operating circuit for resistor shunting switch 23, which extends from conductor 65 through contact fingers 50 and segment 40, conductor 112, coil of switch 23 and conductors 113 and 108 to conductor 66. The closure of the shunting switch 23 thereby shunts resistors 17, 19 and 21 to decrease the resistance of the damper winding circuit. This circuit is further decreased by the bridging of contact fingers 51 by segment 41 shortly after position "g" of the sequence drum is passed, which establishes an energizing circuit for the shunting switch 22 which closes to shunt resistors 16, 18 and 20 and also short circuits the damper winding 15.

As will be readily understood, this further increases the speed of the motor, which at this time has increased in amount such that the centrifugally-operated field-sectionalizing switch, illustrated as contact members 8 and 9, is actuated to its closed position, thereby connecting sections 12, 13 and 14 and the field winding in series.

In order to provide for increasing the pull-in torque of the motor, segment 39 of the sequence drum is so positioned that the operating circuit for the auxliary field switch 88 is interrupted shortly after the sequence drum passes position "h", or in other words, after all the resistance has been removed from the damper winding circuit.

The opening of auxiliary field switch 88 causes the series-connected sections 12, 13 and 14 of the field winding to be connected directly across the resistor 96 through its contact members 87 and 92. In this instance the resistor functions as a pull-in resistor to increase the pull-in torque of motor at synchronism.

Shortly after the sequence drum has passed position "i", contact fingers 44 are bridged by segment 34 which partially establishes a reset circuit for returning the motor-operated switch 31 to its "off" position after the "stop" switch 69 has been opened and permitted to close and contact segment 35 has disengaged contact fingers 45.

Excitation is now applied to the field winding of the motor by the closure of the field switch 53, which is now energized in response to the bridging of contact fingers 48 by segment 38 when the sequence drum is between positions "i" and "j", as shown. This energizing circuit is exactly the same as that traced hereinbefore in connection with the establishment of the test circuit, except that conductor 81 is now connected directly to conductor 65 through contact fingers 48 and segment 38, instead of, to conductor 63 through contact fingers 47 and segment 37. The closure of contact members 54 and 55 connects the field winding directly to the exciter through the field rheostat 93, while the opening of contact members 56 disconnects the pull-in resistor 96.

As will be readily understood, the motor is now operating at synchronous speed and continues to so operate in the same manner as an ordinary synchronous motor.

The motor-operated switch continues to operate and at position "k" of the sequence drum, contact fingers 50 and 51 are disengaged by their segments 40 and 41 to deenergize the resistor shunting switches 22 and 23, thereby rendering the damper winding circuit ready for another starting operation.

As the sequence drum reaches the "l" or "run" position contact fingers 45 are disengaged by segment 35 to interrupt the previously traced energizing circuit of the pilot motor 52 and the switch is stopped in the "run" position and so remains until the "stop" switch is actuated and released.

It will be observed that the operating coil of the over-load relay 74, which is connected to one of the motor leads by means of a suitable current transformer, has been short circuited from the beginning of the starting operation by means of contact fingers 42 and segment 32 of the motor-operated switch. This is necessary in order to prevent operation of the over-load relay 74 in response to the heavy starting current drawn by the motor when the line switch 27 is closed and before the motor comes up to speed. After the motor has been accelerated and synchronized, there is no danger then that overload relay 74 will be operated except in case of an actual overload from which it is desired to protect the motor, and consequently, segment 32 is so disposed on the sequence drum that the shunting circuit is interrupted at some point between positions "j" and "k".

So long as the motor is permitted to operate, the sequence drum of the motor-operated switch 31 remains in the "l" or "run" position. However, when the "stop" switch 69 is actuated, the low-voltage relay 67 is deenergized, which, in turn, effects the opening of line switch 27, relay 100 and field switch 53. The synchronous motor 10 is thereby disconnected from the power source, and all of the control relays returned to their normal deenergized positions.

When the "stop" switch 69 is released, motor-operated switch 31 is automatically returned to the "off" position by means of the reset circuit which was partially established by the bridging of contact fingers 44 by segment 34, as previously described, and finally completed in response to the opening and closing of the "stop" switch. The reset circuit extends from control conductor 63, through contact members of relay 68, "stop" switch 69, conductor 70, contact fingers 44, bridged by segment 34, conductors 99, 98 and 97, contact members 57 of field switch 53, conductors 71 and 72, pilot motor 52, conductor 73, contact members of relay 74, conductors 75 and 76, and contact members 95 to control conductors 64.

The motor-operated switch is now in the proper position to again start the sequence of starting operations in response to the closure of "start" switch 58.

In view of the foregoing it will be apparent that we have provided for starting a synchronous motor, having a sectionalizing switch for its field winding, in such manner that the internal field circuit of the motor is tested to ascertain if the field is sectionalized before starting voltage is applied and for automatically suspending all starting operations if the field winding is not sectionalized.

In addition, the starting system provides for automatically connecting the terminals of the field winding of the motor across a suitable discharge resistor in the event of a failure of the power source for the motor and maintaining the discharge connection regardless of whether or not the power source is restored to its normal energized condition. This latter feature may be utilized in connection with an ordinary synchronous motor, not provided with a field sectionalizing switch as well as with motors of the type illustrated.

It may be stated in conclusion, that, while the illustrated example constitutes a practical embodiment of our invention, we do not wish to limit ourselves strictly to the exact details herein illustrated, since modifications of the same may be made without departing from the spirit of the invention, as defined in the appended claims.

We claim as our invention:

1. In a motor starting system, in combination, a synchronous motor having armature and field windings and a field sectionalizing switch disposed to open the field winding in response to a predetermined reduction in motor speed, a source of power for the motor, means for connecting the motor to the power source, means for energizing the field winding, and means responsive to current flowing in the field winding for rendering the connecting means inoperative, thereby to prevent the application of starting voltage to the motor in the event that the field winding has not been opened by the sectionalizing switch.

2. In a motor starting system, in combination, a synchronous motor having armature and field windings, and a field sectionalizing switch disposed to open the field winding in response to a predetermined reduction in motor speed, a source of power for the motor, a switch operable to connect the motor to the power source, means for controlling the operation of the connecting switch, an energizing circuit for the field winding, and means operable in response to current flowing in the field circuit disposed to render the means for controlling the connecting switch inoperative, thereby to insure that the motor will not be initially energized while the internal field circuit of the motor is closed.

3. In a motor starting system, in combination, a synchronous motor provided with a field winding and a centrifugally-operated field-sectionalizing switch, a source of power for the motor, a source of voltage for energizing the motor field, a field control switch operable to connect the field winding to the voltage source, means for closing the field control switch, and means responsive to a closed condition of the field circuit for effecting the opening of the field control switch.

4. In a motor starting system, in combination, a synchronous motor provided with a field winding and a centrifugally-operated field-sectionalizing switch, a source of power for the motor, a source of excitation voltage for the motor field, a field control switch operable to connect the field winding to the excitation source, and means for controlling the operation of the field control switch including means disposed to be rendered responsive to the flow of current in the field circuit in response to the closure of the field control switch for effecting the opening of the field control switch in the event that the centrifugally-operated field-sectionalizing switch is in its closed-circuit position.

5. In a motor starting system, in combination, a synchronous motor provided with a field winding and a speed-responsive sectionalizing switch for the field winding, in combination, a direct-current source of power for energizing the field winding, means for connecting the field winding to the direct-current source to provide a test circuit, and means automatically operable to interrupt the field circuit in the event that current flows in the test circuit as a result of the sectionalizing switch having failed to open.

6. In a motor starting system, in combination, a synchronous motor provided with a field winding and a speed-responsive sectionalizing switch for the field winding, a source of power for the motor, means for connecting the motor to the power source, a direct-current source of power for energizing the field winding, means for connecting the field winding to the direct-current source to provide a test circuit, and a relay operable in response to the flow of current in the test circuit for causing the connecting means to interrupt the field excitation circuit and to render the means for connecting the motor to the power source inoperative in the event that the sectionalizing switch fails to open when the motor stops.

7. In a motor starting system, in combination, a synchronous motor provided with a field winding and a speed-responsive sectionalizing switch for the field winding, a source of power for the motor, means including an electro-responsive switching device for connecting the motor to the power source, a source of direct-current for energizing the field winding of the motor, means for connecting the field winding to the excitation source, and means responsive in the event that the field circuit is completely established when the connecting means is operated for effecting an interruption of the field circuit and for rendering the electro-responsive switching device inoperative, thereby to prevent the starting of the motor except when the field winding is sectionalized.

8. In a motor starting system, in combination, a synchronous motor provided with a field winding and a speed-responsive sectionalizing switch for the field winding, a source of power for the motor, means for connecting the motor to the power source, a source of direct-current excitation for the motor, means for connecting the field winding to the excitation source, and means disposed to be rendered operative in response to the closure of the field excitation circuit to cause the field connecting means to interrupt the field circuit and render the means for connecting the motor to the power source inoperative, thereby to provide for insuring that the motor shall not be started unless the field sectionalizing switch is in its circuit-interrupting position.

9. In a motor starting system, in combination, a synchronous motor having a field winding and a speed-responsive switch for sectionalizing the field winding in response to a predetermined reduction in motor speed, a source of power for the motor, a switch for connecting the motor to the power source, motor-operated means for controlling the energization of the connecting switch, means for initiating the operation of the motor-operated means, a source of direct-current power for energizing the field winding, means controlled by the motor-operated means for connecting the field winding to the direct-current source before the motor connecting switch is energized, and means operable to effect the deenergization of the motor-operated means in the event that energizing current flows in the field circuit when the field connecting switch is closed.

10. In a motor starting system, in combination, a synchronous motor having a field winding and a speed-responsive switch for sectionalizing the field winding in response to a predetermined reduction in motor speed, a source of power for the motor, a switch for connecting the motor to the power source, motor-operated means for controlling the energization of the connecting switch, means for initiating the operation of the motor-operated means, a source of direct-current power for energizing the field winding, means controlled by the motor-operated means for connecting the field winding to the direct-current source before the motor-connecting switch is energized, and a relay having its operating winding connected in the field circuit for controlling the energization of the motor-operated means, thereby to provide for deenergizing the motor-operated means before it functions to energize the motor-connecting switch in the event that the field circuit is closed through the sectionalizing switch.

11. In a motor starting system, in combination, a synchronous motor provided with a field winding, a source of power for the motor, a source of voltage for energizing the motor field winding, a field resistor, a field control switch operable to a plurality of positions to alternately connect the field winding to the excitation source and the field resistor, an auxiliary field switch having contact members connected in the motor field circuit and normally biased to the closed position, and means operable to control the operation of the field control switch and the auxiliary field switch in a predetermined sequence during the starting period, whereby the auxiliary field switch maintains the field winding open circuited during a portion of the starting period and subsequently connects the field winding to the field resistor through the field control switch for a predetermined time interval, followed by the operation of the field control switch to connect the field winding to the excitation source through the auxiliary field switch.

12. In a motor starting system, in combination, a synchronous motor having a field winding, a source of power for the motor, a main switch for connecting the motor to the power source, a source of voltage for energizing the field winding, a field discharge resistor, a field control switch operable to one position to connect the field winding to the excitation source and to another position to connect said field winding to the discharge resistor, an auxiliary field switch normally biased to one position to connect the field winding to the discharge resistor through the field control switch and operable to interrupt said connection, and means including a timing switch for effecting the operation of the main switch, field control switch and the auxiliary field switch in a predetermined sequence to start the motor, said means being operable to initially operate the auxiliary field switch to disconnect the field winding from the field control switch and the resistor and to operate the main switch to energize the motor and after a predetermined time interval to reconnect the field winding to the discharge resistor through the field control switch in one position, and after a second predetermined time interval to operate the field control switch to its other position to connect the field winding to the excitation source.

13. In a motor control system, in combination, a synchronous motor provided with a field winding, a source of power for the motor, a main switch for connecting the motor to the power source, a source of voltage for energizing the field winding, a field discharge resistor, a field control switch having normally closed contact members for connecting the field winding to the discharge resistor and operable to connect said field winding to the excitation source, an auxiliary field switch normally biased to the open position to connect the field winding to the field discharge resistor and operable to interrupt said connection and effect the operation of the main switch, and a motor operated timer operable to operate the auxiliary field switch to the closed position to effect the operation of the main switch and to disconnect the field winding from the discharge resistor and further operable after the expiration of a predetermined time interval to deenergize the auxiliary field switch to effect a reconnection of the field winding to the discharge resistor for a predetermined time interval and at the expiration of said time interval to effect the operation of the field control switch to connect the field winding to the excitation source.

14. In a motor starting system, in combination, a synchronous motor having a sectionalized field winding and a field sectionalizing switch automatically operable to connect the sections of the field winding together in response to the attainment of a predetermined motor speed, a source of power for the motor, a main switch for connecting the motor to the power source, a source of excitation voltage, a field control switch operable to connect the field winding to the excitation source, means operable to effect the operation of the field control switch and the main switch in a predetermined sequence, and means responsive to a flow of current through the field winding for rendering said means ineffective to cause the operation of the main switch thereby to insure that the field winding has become sectionalized before voltage is applied to the motor.

15. In a motor starting system, in combination, a synchronous motor provided with a field winding, a source of power for the motor, a main switch operable to connect the motor to the power source, a source of voltage for energizing the field winding, a field control resistor, a field discharge resistor, an auxiliary field switch having spring-closed contact members connected to the field winding, a field control switch operable to one position to connect the field winding to the excitation source in series with the field control resistor through the spring-closed contact members of the auxiliary field switch, and to another position to connect the field winding to the discharge resistor through the spring-closed contact members of the auxiliary field switch, and means including a timing device operable to control the operation of the main switch, the field control switch and the auxiliary field switch in a predetermined sequence to start the motor, whereby the auxiliary field switch is first energized to open circuit the motor field winding followed by a closure of the main switch to energize the motor and the auxiliary field switch deenergized after a predetermined time to connect the field winding to the discharge resistor through the field control switch followed at the expiration of another predetermined time interval by the operation of the field control switch to connect the field winding to the excitation source through the field control resistor and the spring-closed contact members of the auxiliary field switch.

ARMAND M. KAHN.
MERRITT A. HYDE.